United States Patent
Yao et al.

(10) Patent No.: US 7,248,411 B2
(45) Date of Patent: Jul. 24, 2007

(54) OPTICAL FILM WITH ARRAY OF MICROSTRUCTURES AND THE LIGHT SOURCE APPARATUS UTILIZING THE SAME

(75) Inventors: Po-Hung Yao, Luzhu Shiang (TW); I-Kai Pan, Kaohsiung (TW); Ben-Sheng Lin, Hsinchu (TW); Heng-Chun Huang, Miaoli (TW); Yu-Nan Pao, Zhubei (TW); Yi-Ting Sun, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/295,670

(22) Filed: Dec. 7, 2005

(65) Prior Publication Data

US 2006/0291064 A1    Dec. 28, 2006

(30) Foreign Application Priority Data

Jun. 24, 2005    (TW)    .............................. 94121095 A (51) Int. Cl.
G02B 27/10    (2006.01)
G02B 27/30    (2006.01)
G02B 5/02    (2006.01)

(52) U.S. Cl. ...................... 359/619; 359/628; 359/641; 359/599

(58) Field of Classification Search ................ 359/619, 359/621, 622, 628, 623, 624, 641, 615, 558, 359/566, 569, 574

See application file for complete search history.

(56) References Cited

U.S. PATENT DOCUMENTS 6,091,547 A      7/2000   Gardiner et al. ............. 359/625
6,538,819 B2 *  3/2003   Tanaka ........................ 359/619
6,930,818 B1 *  8/2005   Liang et al. ................. 359/296

FOREIGN PATENT DOCUMENTS

JP         2001324608        11/2001

* cited by examiner

Primary Examiner—Loha Ben
Assistant Examiner—Jack Dinh
(74) Attorney, Agent, or Firm—Troxell Law Office, PLLC (57) ABSTRACT

The present invention discloses an optical film with array of microstructures, having a first optical surface and a second optical surface for receiving an incident light. The optical film comprises at least a transparent microstructure formed on the first optical surface, wherein the microstructure further comprises: a first side for scattering the incident light; and a second side for collimating the incident light.

15 Claims, 10 Drawing Sheets

OPTICAL FILM WITH ARRAY OF MICROSTRUCTURES AND THE LIGHT SOURCE APPARATUS UTILIZING THE SAME

FIELD OF THE INVENTION

The present invention relates to an optical film with array of microstructures and the light source apparatus utilizing the same, and more particularly, to an optical film having at least a diffusion unit and at least a collimation unit formed on a same surface thereof.

BACKGROUND OF THE INVENTION

Nowadays, it is commonly seen that backlight modules are used for electronic devices with flat panel displays, which includes devices as small as hand-held palm pilots and as large as big-screen TVs. A typical backlight consists of a light source, such as Cold Cathode Fluorescent Lamp (CCFL) or Light Emitting Diodes (LED), a light guide, a diffuser, and a brightness enhancement film. The design challenge of a backlight module is to generate uniform illumination across the LCD surface and luminance that is high enough to produce good contrast in a day environment (so that you can see the display of a laptop computer or a handheld electronic device, for example, with the room lights on), by the cooperation of the diffuser and the brightness enhancement film. Although, Taiwan is now one of the three major production countries for Notebook PCs, the critical component, backlight modules, still has to be imported and there is a heavy reliance on foreign providers. Thus, it is imperative for Taiwan to establish the design and production technology. Moreover, a conventional backlight usually consists of a plurality of optical films, which is the cause of low luminous efficacy, high manufacture cost and low assembly yield, and so on.

Figure 1:
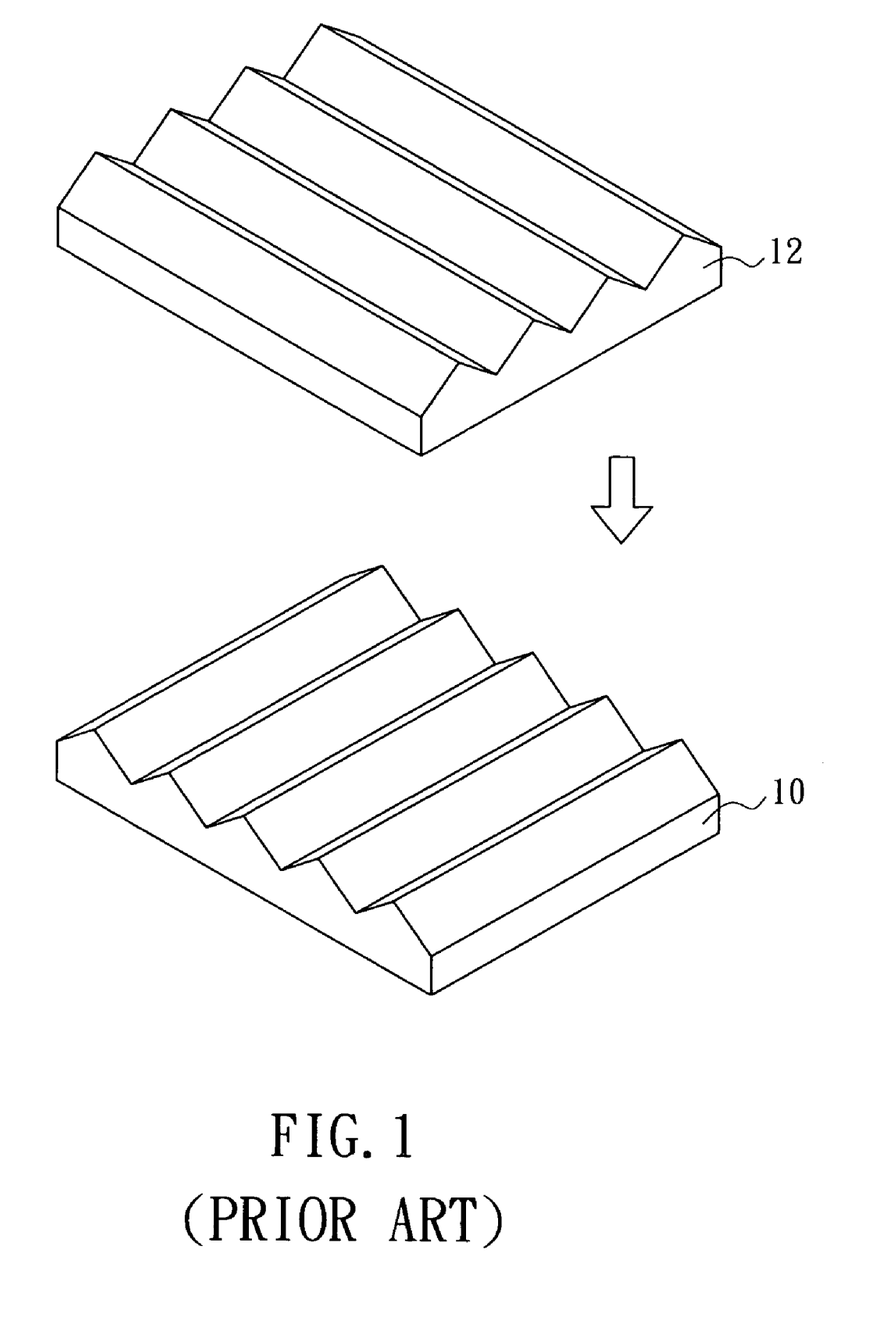
FIG. 1 is a perspective view of a luminance control film assembly disclosed in U.S. Pat. No. 6,280,063.

Please refer to FIG. 1, which is a perspective view of a luminance control film assembly disclosed in U.S. Pat. No. 6,091,547, entitled "Luminance Control Film". The luminance control film assembly of FIG. 1 is the formation of stacking a luminance control film 12 on top of another luminance control film 10, which can control and guide incident light to collimate for achieving the objects of improving on-axis luminance. However, the disclosed luminance control film is capable of collimating light effectively, it is disadvantageous by being able to diffuse incident light sufficiently enough to produce uniform illumination.

Figure 2:
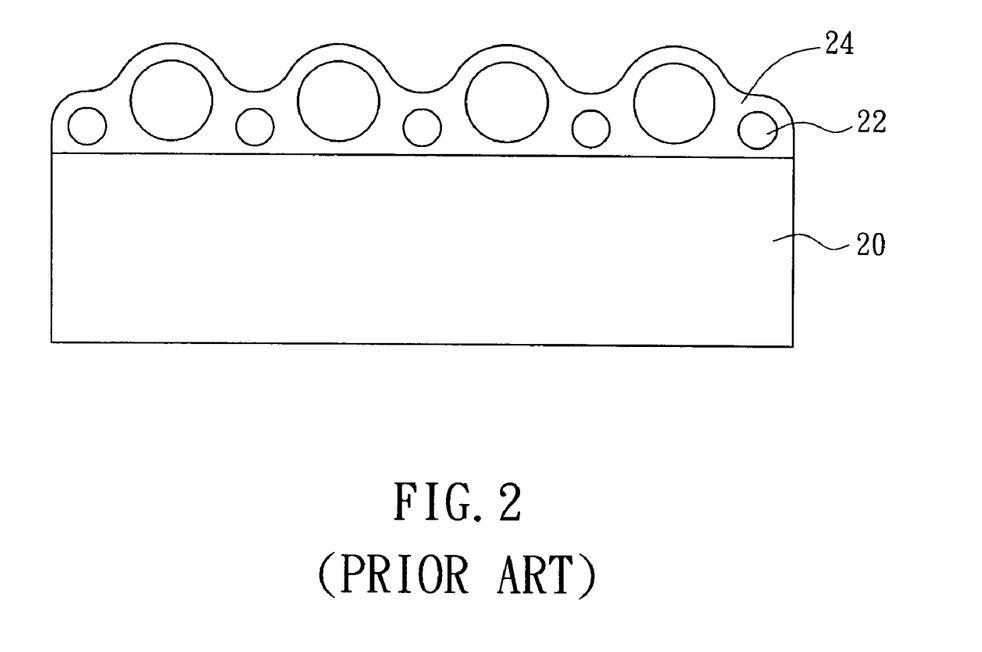
FIG. 2 is a cross-sectional view of a light-diffusing sheet disclosed in Japan. Pat. No. 2001324608.

Please refer to FIG. 2, which is a cross-sectional view of a light-diffusing sheet disclosed in Japan. Pat. No. 2001324608, entitled "Light-Diffusing Sheet". The light-diffusing sheet of FIG. 2 is substantially a layer of resin 24 formed on a transparent substrate 20 with a plurality of resin particles 22 of different diameter dispersed therein, which enables incident light to be scattered and thus diffused, but is disadvantageous by the effect of reducing luminous efficiency caused by the light-scattering of the plural particles 22.

Therefore, it is in great demand to have an improved light modulation element capable of overcoming the shortcomings of prior arts.

SUMMARY OF THE INVENTION

In view of the disadvantages of prior art, the primary object of the present invention is to provide an optical film with array of microstructures, which is capable of enhancing luminous efficiency of an light source apparatus utilizing the same by utilizing the array of microstructures formed on an optical surface of the optical film, each microstructure being consisted of two sides of different profiles for achieving effects of light scattering and collimating respectively.

Another object of the invention is to provide an optical film with array of microstructures and the light source apparatus utilizing the same, characterized in that the optical film with array of micro-structures is integrally manufactured by rolling a roller embossed with microstructures on a flexible substrate for imprinting the microstructures thereon, and thus the manufacturing cost of the an optical film with array of micro-structures can be reduced.

To achieve the above objects, the present invention provides an optical film with array of micro-structures, having a first optical surface and a second optical surface for receiving an incident light, the optical film comprising at least a microstructure made of a transparent material and being formed on the first optical surface, wherein the microstructure has a first side for scattering the incident light and a second side for collimating the incident light.

To achieve the above objects, the present invention further features a light source apparatus, comprising:

a reflector;

a light guide plate, arranged over the reflector;

at least a light source, arranged at a side of the light guide plate for emitting an incident light; and at least an optical film with array of microstructures, being arranged on the light guide plate, each optical film having a first optical surface and a second optical surface for receiving an incident light while each being comprised of at least a microstructure, made of a transparent material and being formed on the first optical surface, each microstructure having a first side for scattering the incident light and a second side for collimating the incident light.

In a preferred aspect, the first side is arranged next to the second side. More over, the profile of the first side is an arc having a radius of curvature preferably in the range of 5 microns to 500 microns while the profile of the second side is a triangle having a specific height preferably in the range of 0 micron to 500 microns.

In a preferred aspect, the second optical surface can be an optical surface selected from the group consisting of a rugged surface and a smooth surface.

In a preferred aspect, the process for manufacturing the optical film with array of microstructure of the invention comprises the steps of:

coating a layer of an UV curable material on a flexible substrate;

rolling a roller embossed with an array of microstructures on the layer of UV curable material for patterning the UV curable material; and curing the layer of UV curable material.

Preferably, the optical film comprises two microstructures positioned next to each other, by which a specific included angle is formed between the two first sides of the two corresponding microstructures arranged next to each other. In a preferred aspect, the included angle is in the range of 30° to 140°.

Preferably, the second optical surface can be a rugged surface integrally formed on the substrate, or can be a rugged surface coated on the substrate.

Yet, preferably, the light source apparatus of the invention can comprises two optical film with array of microstructures, wherein the orientation of one of the two optical films is rotated by an angle range between 0° and 90° to be placed overlapping another optical film.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 3A:
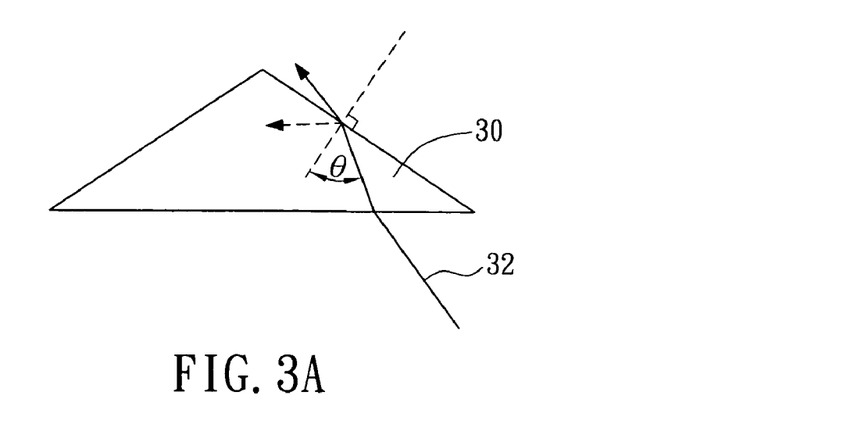
FIG. 3A is a schematic diagram depicting the optical characteristics of a prism shaped lens.

According to Snell's Law, it is noted that a prism shaped lens can be used to collimate light effectively as seen in FIG. 3A, that is, it can reduce the divergent angle of an incident light. In FIG. 3A, when an incident light 32 traveling in the prism 30 is traveling across an interface from the prism 30 to the external environment by an angle of θ, i.e. from a media with higher refractive index to another media with lower refractive index, at the condition that the incident angle θ is larger than the critical angle of total internal reflection, then the light is totally reflected off the interface following the dotted arrow of FIG. 3A, on the other hand, when the incident angle θ is smaller than the critical angle of total internal reflection, the exiting light, shown as the solid arrow of FIG. 3A, will bend away from the normal of the interface(i.e. the dotted line of FIG. 3A).

Figure 3B:
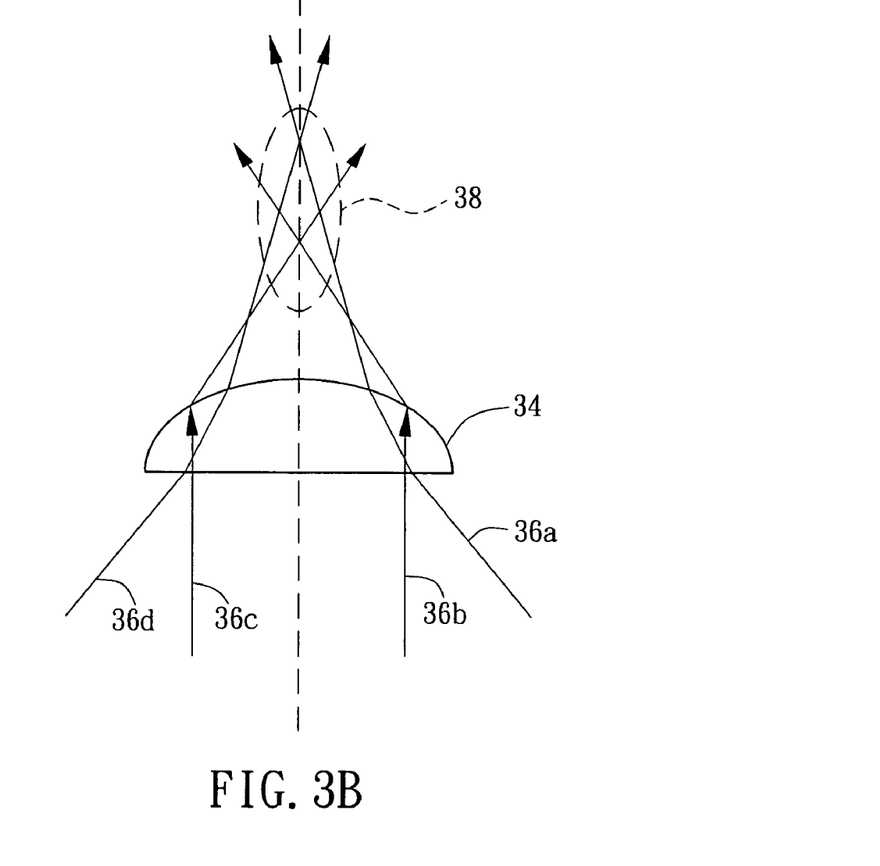
FIG. 3B is a schematic diagram depicting the optical characteristics of a semi-lenticular lens shaped lens.

Please refer to FIG. 3B, which is a schematic diagram depicting the optical characteristics of a semi-lenticular lens shaped lens. It is noted that a semi-column shaped lens can be used to controllably diffuse light within a specific range. As seen in FIG. 3B, as four incident light 36a, 36b, 36c and 36d, each incident to the lens 34 by different angles, is traveling across an interface from the lens 34 to the external environment, all the exiting light corresponding respectively to the four incident light will converge in the convergence area 38 and then dissipate. Accordingly, the exiting angle of the light with large incident angle can be controlled to converge so as to enable all the incident light to be uniformly and controllably diffused.

Thus, by forming microstructures with the two aforesaid geometric characteristics on a surface of an optical film, the optical film with array of microstructures is enabled to collimate as well as diffuse light. Hence, by a superposed formation of the prisms and the semi-lenticular lens, the optical film with array of microstructures is equipped with light collimation and diffusion capabilities.

Figure 4A:
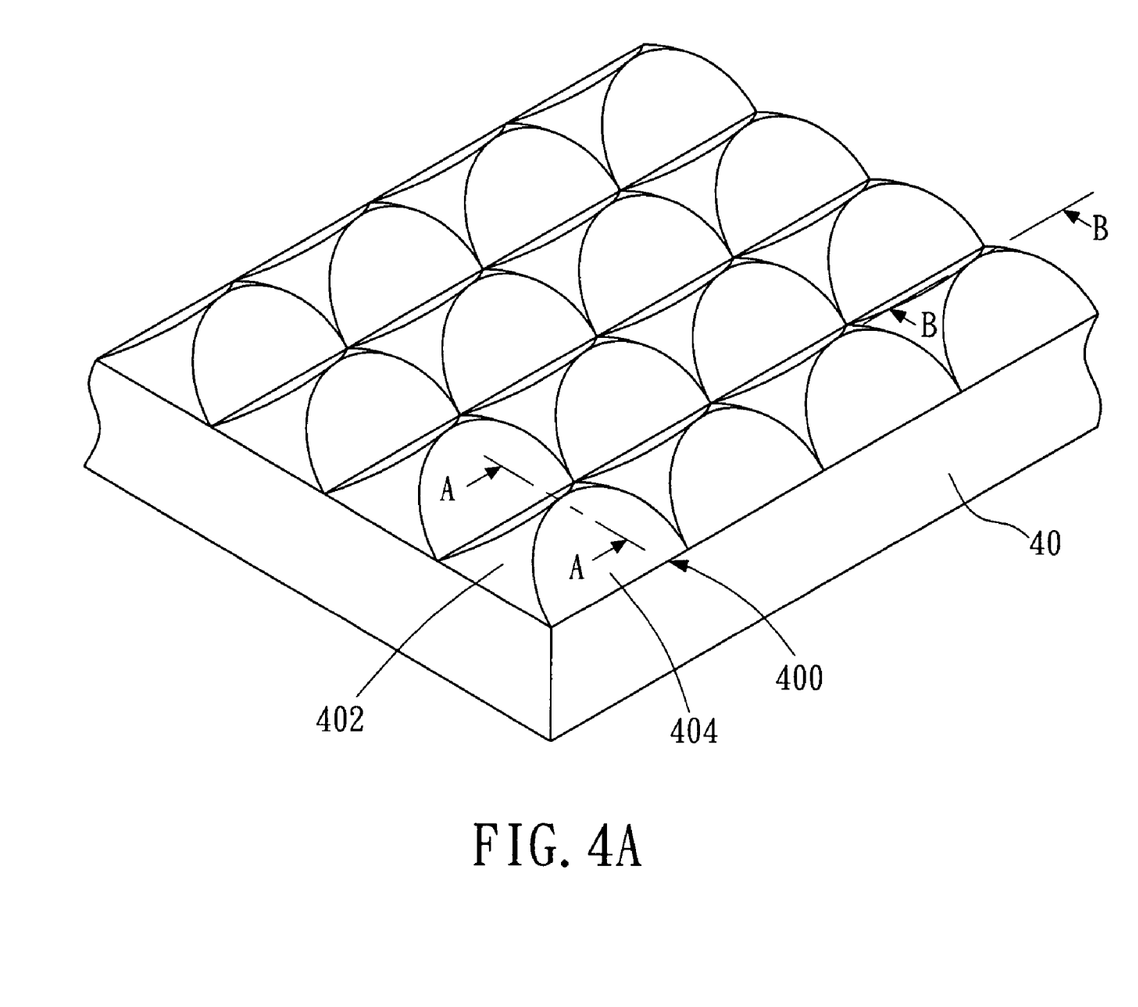
FIG. 4A is a 3D view of an optical film with array of microstructures according to a preferred embodiment of the present invention.

Please refer to FIG. 4A, which is a 3D view of an optical film with array of microstructures according to a preferred embodiment of the present invention. The optical film with array of microstructures 40 have a first optical surface 42 and a second optical surface 44 for receiving an incident light, which can be seen in FIG. 4B and FIG. 4C. As seen in FIG. 4A, an array of microstructures 400 is form on the first optical surface 42, and each microstructure 400 has a side 402 for collimating the incident light and another side 402 for scattering the incident light, wherein the two sides 404, 404 are being arranged next to each other. In a preferred embodiment of the invention, the microstructure 400 has two sides 402, positioned opposite to each other, and another two sides 404, positioned opposite to each other.

Figure 4B:
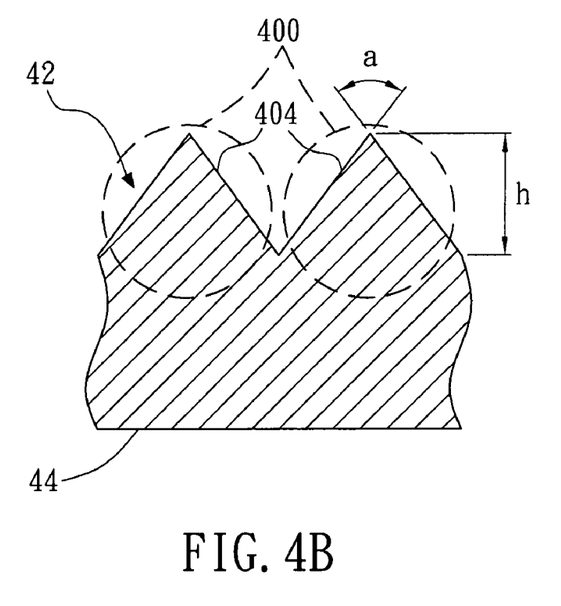
FIG. 4B is an A—A cross-sectional view of FIG. 4A.

FIG. 4B is an A—A cross-sectional view of FIG. 4A. As seen in FIG. 4B, the profile of the side 402 is a triangle, featuring by a specific height h and a specific included angle a, which is the top angle of the microstructures 400. In a preferred aspect, the included angle is in the range of 30° to 140°.

Figure 4C:
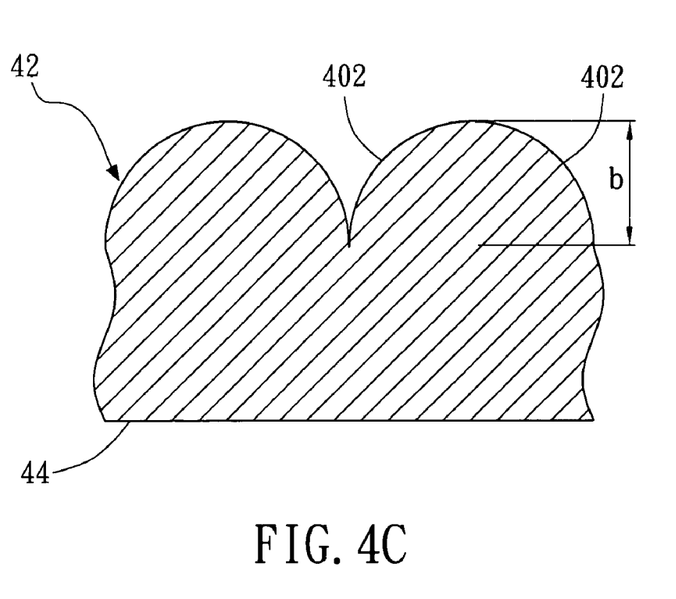
FIG. 4C is a B—B cross-sectional view of FIG. 4A.

FIG. 4 is a B—B cross-sectional view of FIG. 4A. As seen in FIG. 4C, the profile of the side 402 is an arc, featuring by a radius of curvature b. In a preferred aspect, the radius of curvature b is in the range of 5 microns to 500 microns.

Since each microstructure 400 is characterized by the specific height h, the radius of curvature b and the material of the optical film 40 (i.e. the refractive index of the optical film 40), the light collimation and diffusion capability of the optical film with array of microstructures 40 can be controlled by the proper selection of the specific height h, the radius of curvature b. In addition, the luminance of a light source apparatus utilizing the optical film 40 can be control by proper selection of the amount of the optical films used and the arrangement of the optical films used.

Figure 5:
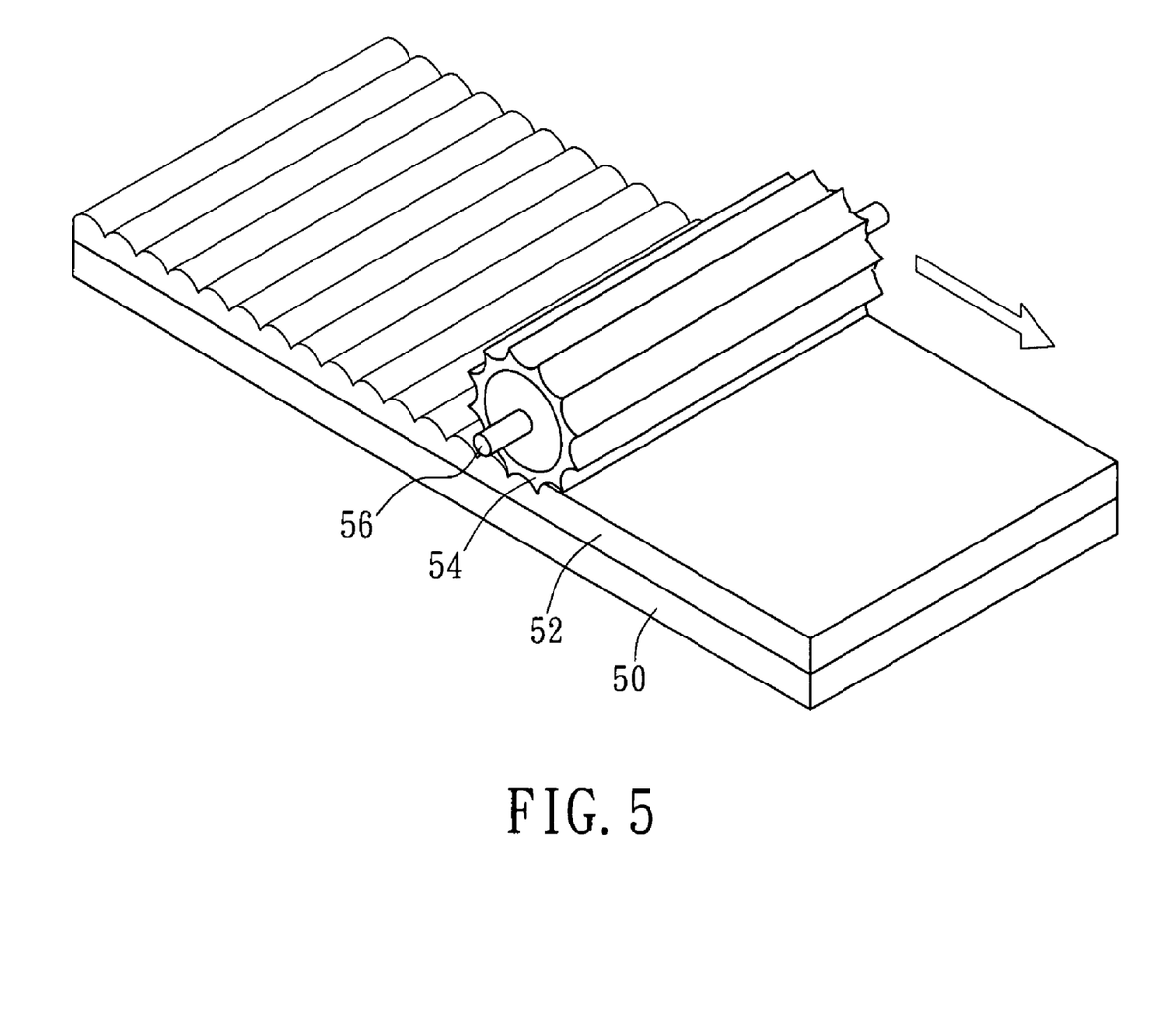
FIG. 5 is a schematic diagram showing a rolling process for manufacturing an optical film with array of microstructures of the invention.

FIG. 5 depicts a rolling process for manufacturing an optical film with array of microstructures of the invention. The process for manufacturing the optical film with array of microstructures of the invention comprises the steps of:

coating a layer of an UV curable material 52 on a flexible substrate 50;

rolling a roller 56 embossed with microstructures 54 on the layer of UV curable material 52 for patterning the UV curable material 52; and curing the layer of UV curable material 52.

Figure 6:
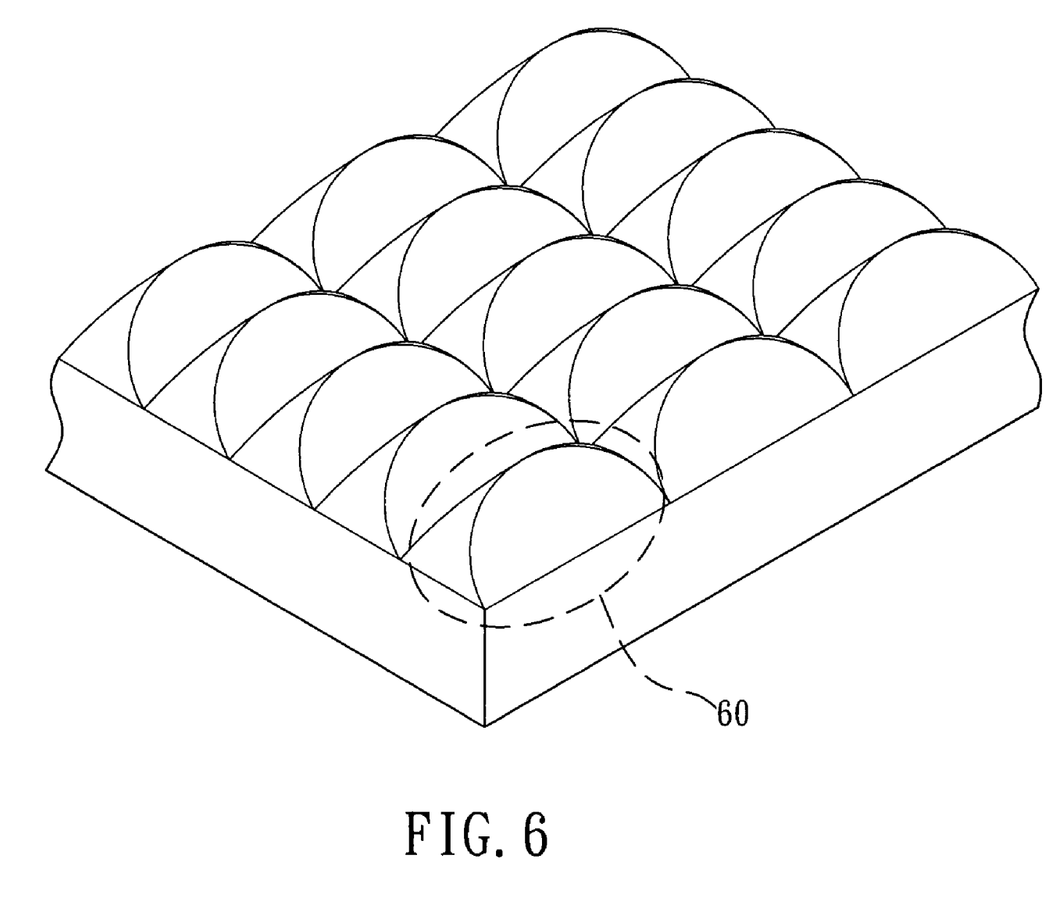
FIG. 6 is a 3D view of an optical film with array of microstructures according to another preferred embodiment of the present invention.

It is noted that the featuring of the microstructure of the optical film of the invention can be varied. As seen in FIG. 6, an array of microstructures 60 is featuring by a smaller included angle and a larger radius of curvature while comparing to that of the microstructures 40 of FIG. 4A, such that the featuring of the microstructure can be selected as required and thus are not described further hereinafter.

Figure 7:
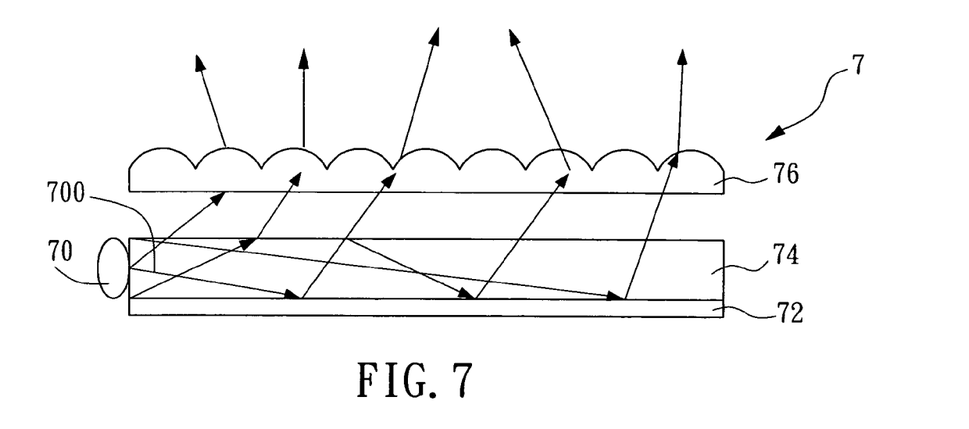
FIG. 7 is a cross-sectional view of a light source apparatus utilizing the optical film with array of microstructures according to a preferred embodiment of the present invention.

Please refer to FIG. 7, which is a cross-sectional view of a light source apparatus utilizing the optical film with array of microstructures according to a preferred embodiment of the present invention. The light source apparatus 7 of the invention comprises a light source 70, a reflector 72, a light guide plate 74, and an optical film with array of microstructures 76; wherein the light source 70 is arranged at a side of the light guide plate 74 for emitting an incident light 700 thereto; the light guide plate 74 is arranged over the reflector 72; and the optical film 76 is arranged at a position over the light guide plate 74; thereby the optical performance of the light source apparatus 7 is enhanced since the optical film 76 is capable of diffusing and collimating the incident light 700 simultaneously in a specific direction (i.e. a display utilizing the light source apparatus can either has a better vertical viewing angle or a better horizontal viewing angle).

Figure 8:
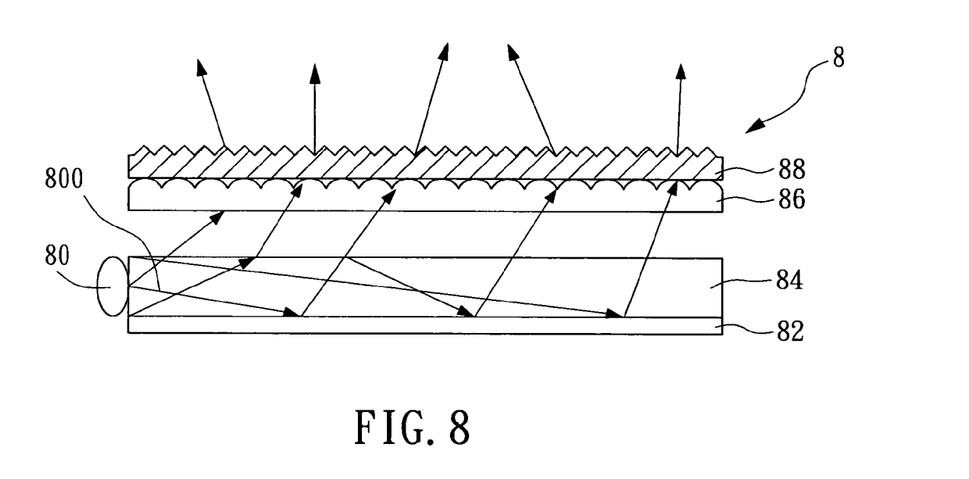
FIG. 8 is a cross-sectional view of a light source apparatus utilizing the optical film with array of microstructures according to another preferred embodiment of the present invention.
Figure 9:
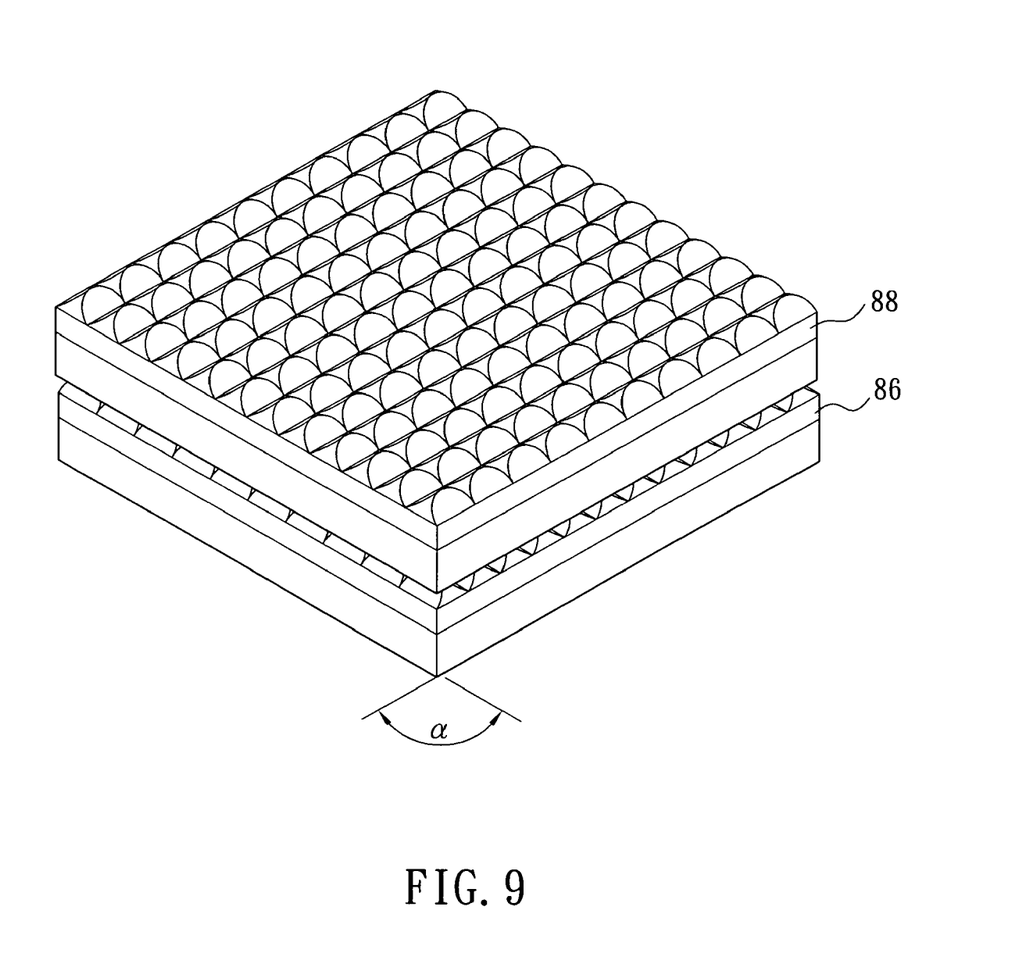
FIG. 9 is cross-sectional view of stacked optical films according to the present invention.

Please refer to FIG. 8, which is a cross-sectional view of a light source apparatus utilizing the optical film with array of microstructures of another preferred embodiment of the present invention. The light source apparatus 8 of the invention comprises a light source 80, a reflector 82, a light guide plate 84, and two optical films with array of microstructures 86, 88; wherein the light source 80 is arranged at a side of the light guide plate 84 for emitting an incident light 800 thereto; the light guide plate 84 is arranged over the reflector 82; and the orientation of the optical film 88 are being rotate by an angle α (as seen in FIG. 9) to be placed over the optical film 86 while the two stacked optical films 86, 88 are arranged at a position over the light guide plate 84; thereby the optical performance of the light source apparatus 8 is enhanced since the optical films 86, 88 is capable of diffusing and collimating the incident light 800 simultaneously in two specific directions (i.e. the vertical viewing angle and the horizontal viewing angle of a display utilizing the luminance control apparatus can both be increased simultaneously).

Figure 10:
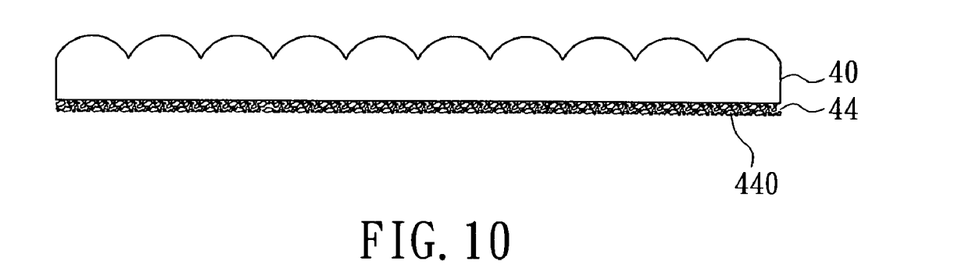
FIG. 10 is cross-sectional view of an optical film with array of microstructures according to another preferred embodiment of the present invention.
Figure 11:
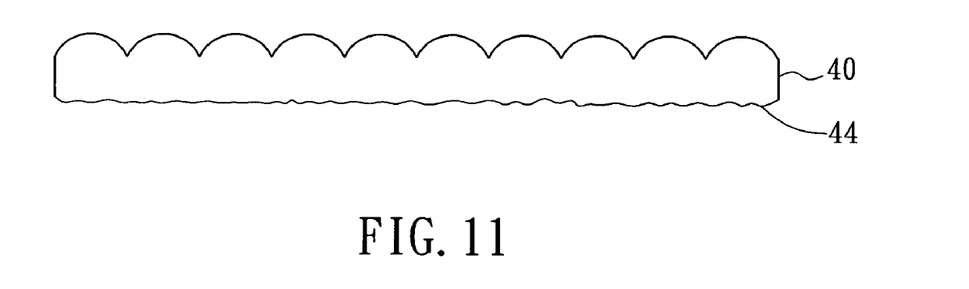
FIG. 11 is cross-sectional view of an optical film with array of microstructures according to yet another preferred embodiment of the present invention.

In a preferred embodiment of the invention, the profile of the arc is characterized by a radius of curvature preferably in the range of 5 microns to 500 microns, and the profile of the triangle is characterized by a specific height preferably in the range 0 micron to 500 microns. Moreover, as seen respectively in FIG. 11 and FIG. 10, the second optical surface can be an optical surface selected from the group consisting of a rugged surface and a smooth surface. When the second optical surface is designed as a rugged surface, the rugged surface either can be integrally formed while manufacturing the optical film 40, or can be formed by coating a layer of resin with particles 440 dispersed therein. Furthermore, in another preferred embodiment of the invention, when the light source apparatus of the invention comprises two optical films with array of microstructures, the orientation of one of the two light modulation elements is being rotated by an angle in the range of 0° to 90° to be placed overlapping another light modulation element.

From the above description, it is noted that the light modulation element of the invention is equipped with functions of light collimation and diffusion simultaneously, which can be used as the replacement for a conventional brightness enhancement film and a diffuser. Moreover, as the light modulation element of the invention is being applied in a luminance control apparatus like a backlight module, not only the luminous efficacy of the backlight module is enhanced, but also the manufacturing cost of the backlight module is reduced because of the structure of the same is simplified.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An optical film with array of microstructures, having a first optical surface and a second optical surface for receiving an incident light, comprising:
    a plurality of transparent microstructures formed on the first optical surface wherein the plurality of transparent microstructures comprises multiple adjacent transparent microstructures in horizontal rows and other multiple adjacent transparent microstructures in vertical rows, wherein each microstructure further comprises a first side for scattering the incident light, and a second side for collimating the incident light.

2. The optical film with array of microstructures of claim 1, wherein the first side is arranged next to the second side.

3. The optical film with array of microstructures of claim 1, wherein the profile of the first side is an arc.

4. The optical film with array of microstructures of claim 3, wherein the radius of curvature of the arc is in the range of 5 microns to 500 microns.

5. The optical film with array of microstructures of claim 3, wherein the arc is featuring by more than one curvature.

6. The optical film with array of microstructures of claim 3, wherein the profile of the second side is a triangle, being a triangle selected from the group consisting of a triangle aligned perpendicular to the arc of the first side and a triangle aligned not perpendicular to the arc of the first side.

7. The optical film with array of microstructures of claim 1, wherein the second side is featuring by a specific height.

8. The optical film with array of microstructures of claim 7, wherein the specific height is in the range of 0 micron to 500 microns.

9. The optical film with array of microstructures of claim 1, wherein the second optical surface is a smooth surface.

10. The optical film with array of microstructures of claim 1, wherein the second optical surface is a rugged surface.

11. The optical film with array of microstructures of claim 1, wherein the process for manufacturing the optical film with array of microstructure comprises the steps of:
    coating a layer of an UV curable material on a flexible substrate;
    rolling a roller embossed with an array of microstructures on the layer of UV curable material for patterning the UV curable material; and
    curing the layer of UV curable material.

12. The optical film with array of microstructures of claim 1, wherein a specific included angle is the top angle of the corresponding microstructure.

13. The optical film with array of microstructures of claim 12, wherein the included angle is in the range of 30° to 140°.

14. The light source apparatus of claim 1, wherein the second side is featuring by a specific height.

15. The light source apparatus of claim 14, wherein the specific height is in the range of 0 micron to 500 microns.

* * * * *